United States Patent
Subramanian

(10) Patent No.: US 8,114,800 B2
(45) Date of Patent: Feb. 14, 2012

(54) CERAMIC POWDER, CERAMIC LAYER AND LAYER SYSTEM HAVING GADOLINIUM/MIXED CRYSTAL PYROCHLORE PHASES AND OXIDES

(75) Inventor: Ramesh Subramanian, Oviedo, FL (US)

(73) Assignee: Siemens Aktiengesellschaft, Munich (DE)

(*) Notice: Subject to any disclaimer, the term of this patent is extended or adjusted under 35 U.S.C. 154(b) by 902 days.

(21) Appl. No.: 12/151,421

(22) Filed: May 6, 2008

(65) Prior Publication Data
US 2008/0292859 A1  Nov. 27, 2008

Related U.S. Application Data

(60) Provisional application No. 60/928,085, filed on May 7, 2007.

(30) Foreign Application Priority Data

May 7, 2007  (EP) .................................... 07009113

(51) Int. Cl.
C04B 35/00 (2006.01)
C04B 35/48 (2006.01)
C04B 35/49 (2006.01)
C03C 27/00 (2006.01)
C03C 29/00 (2006.01)
B32B 9/00 (2006.01)

(52) U.S. Cl. ........ 501/126; 501/103; 501/134; 428/633; 428/697

(58) Field of Classification Search ............ 501/126, 501/134, 103, 104; 428/632, 633, 697, 472
See application file for complete search history.

(56) References Cited

U.S. PATENT DOCUMENTS

| | | | |
|---|---|---|---|
| 6,024,792 A | 2/2000 | Kurz et al. | |
| 6,117,560 A * | 9/2000 | Maloney | 428/472 |
| 6,177,200 B1 * | 1/2001 | Maloney | 428/472 |
| 2002/0061416 A1 * | 5/2002 | Subramanian | 428/633 |
| 2002/0172837 A1 * | 11/2002 | Allen et al. | 428/632 |
| 2006/0286401 A1 | 12/2006 | Kaiser et al. | |
| 2007/0160859 A1 * | 7/2007 | Darolia et al. | 428/469 |

FOREIGN PATENT DOCUMENTS

| | | |
|---|---|---|
| DE | 202005020695 U1 | 7/2006 |
| DE | 202006009526 U1 | 9/2006 |
| DE | 202006009527 U1 | 9/2006 |
| DE | 202006009603 U1 | 12/2006 |
| EP | 0 412 397 B1 | 2/1991 |
| EP | 0 486 489 B1 | 5/1992 |
| EP | 0 892 090 A1 | 1/1999 |
| EP | 0 786 017 B1 | 3/1999 |
| EP | 0 944 746 B1 | 9/1999 |
| EP | 0 992 603 A1 | 4/2000 |
| EP | 1 306 454 A1 | 5/2003 |
| EP | 1 319 729 A1 | 6/2003 |
| EP | 1 204 776 B1 | 6/2004 |
| WO | WO 99/67435 A1 | 12/1999 |
| WO | WO 00/44949 A1 | 8/2000 |

* cited by examiner

*Primary Examiner* — Jerry Lorengo
*Assistant Examiner* — Noah Wiese

(57) ABSTRACT

There is described a ceramic powder, ceramic layer and layer system having gadolinium/mixed crystal pyrochlore phases and oxides. Besides a good thermal insulation property, thermal insulation layer systems must also have a long lifetime of the thermal insulation layer. The layer system according to the invention has an outer ceramic layer, which comprises a mixed crystal of gadolinium zirconate and gadolinium hafnate.

17 Claims, 4 Drawing Sheets

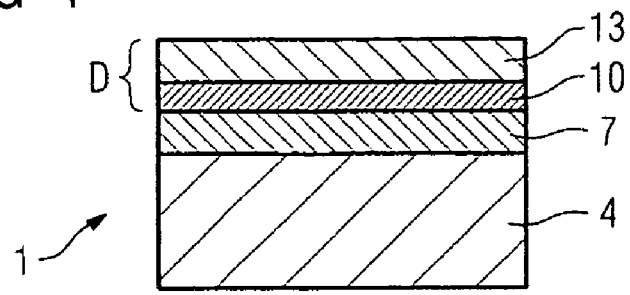
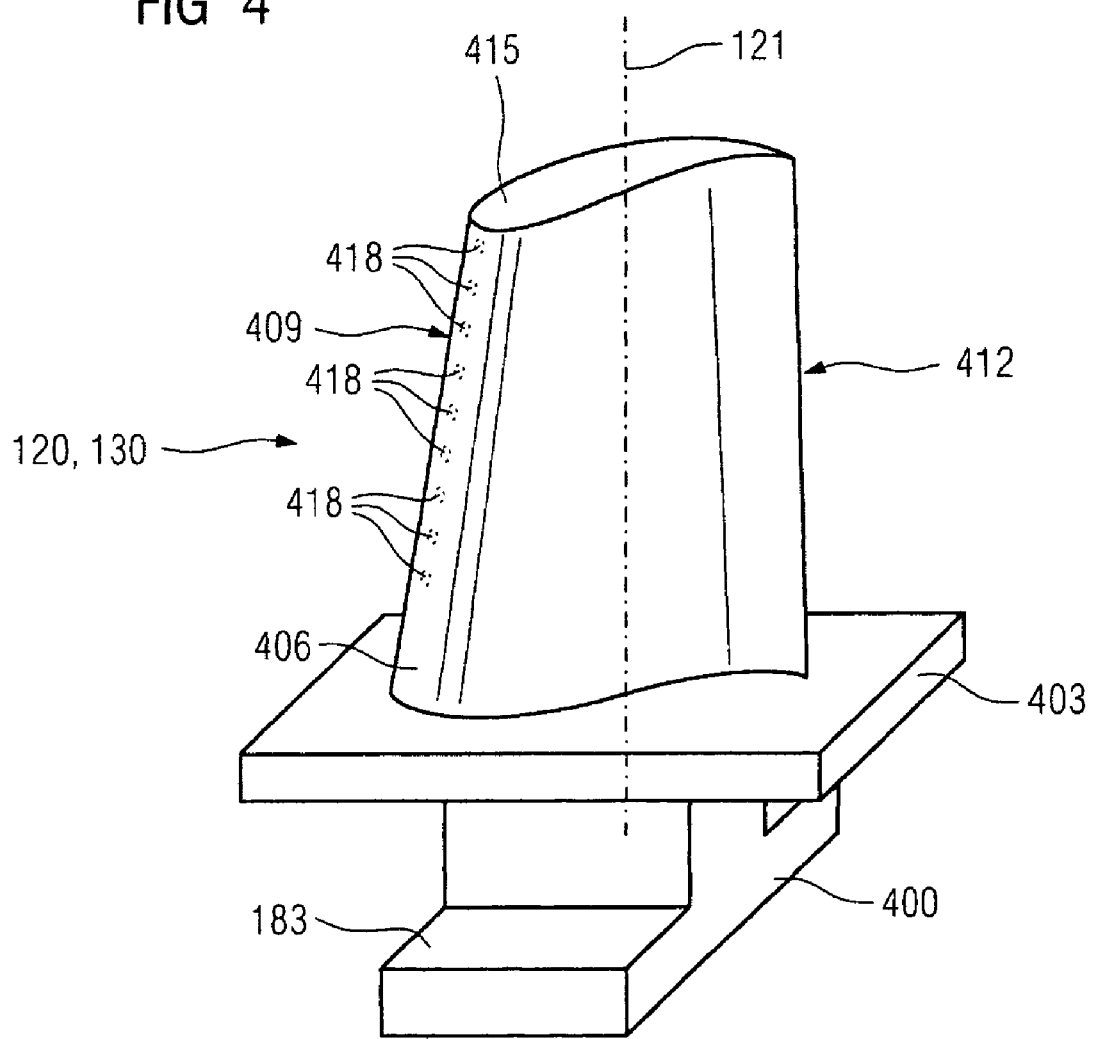

FIG 2

| Material | C | Cr | Ni | Co | Mo | W | Ta | Nb | Al | Ti | B | Zr | Hf |
|---|---|---|---|---|---|---|---|---|---|---|---|---|---|
| Ni-based precision casting alloys | | | | | | | | | | | | | |
| GTD 222 | 0.10 | 22.5 | Remainder | 19.0 | | 2.0 | 1.0 | 1.0 | 1.2 | 2.3 | 0.008 | | |
| IN 939 | 0.15 | 22.4 | Remainder | 19.0 | | 2.0 | 1.4 | 1.0 | 1.9 | 3.7 | 0.009 | 0.10 | |
| IN 6203 DS | 0.15 | 22.0 | Remainder | 19.0 | | 2.0 | 1.1 | 0.8 | 2.3 | 3.5 | 0.010 | 0.10 | 0.75 |
| Udimet 500 | 0.10 | 18.0 | Remainder | 18.5 | 4.0 | | | | 2.9 | 2.9 | 0.006 | 0.05 | |
| IN 738 LC | 0.10 | 16.0 | Remainder | 8.5 | 1.7 | 2.6 | 1.7 | 0.9 | 3.4 | 3.4 | 0.010 | 0.10 | |
| SC 16 | <0.01 | 16.0 | Remainder | | 3.0 | | 3.5 | | 3.5 | 3.5 | <0.005 | <0.008 | |
| Rene 80 | 0.17 | 14.0 | Remainder | 9.5 | 4.0 | 4.0 | | | 3.0 | 5.0 | 0.015 | .03 | |
| GTD 111 | 0.10 | 14.0 | Remainder | 9.5 | 1.5 | 3.8 | 2.8 | | 3.0 | 4.9 | 0.012 | 0.03 | |
| GTD 111 DS | | | | | | | | | | | | | |
| IN 792 CC | 0.08 | 12.5 | Remainder | 9.0 | 1.9 | 4.1 | 4.1 | | 3.4 | 3.8 | 0.015 | 0.02 | 1.00 |
| IN 792 DS | 0.08 | 12.5 | Remainder | 9.0 | 1.9 | 4.1 | 4.1 | | 3.4 | 3.8 | 0.015 | 0.02 | 1.50 |
| MAR M 002 | 0.15 | 9.0 | Remainder | 10.0 | | 10.0 | 2.5 | | 5.5 | 1.5 | 0.015 | 0.05 | 1.40 |
| MAR M 247 LC DS | 0.07 | 8.1 | Remainder | 9.2 | 0.5 | 9.5 | 3.2 | | 5.6 | 0.7 | 0.015 | 0.02 | |
| CMSX-2 | <.006 | 8.0 | Remainder | 4.6 | 0.6 | 8.0 | 6.0 | | 5.6 | 1.0 | <.003 | <.0075 | 0.10 |
| CMSX-3 | <.006 | 8.0 | Remainder | 4.6 | 0.6 | 8.0 | 6.0 | | 5.6 | 1.0 | <.003 | <.0075 | 0.10 |
| CMSX-4 | | 6.0 | Remainder | 10.0 | 0.6 | 6.0 | 6.0 | | 5.6 | 1.0 | | Re=3.0 | 0.10 |
| CMSX-6 | <.015 | 10.0 | Remainder | 5.0 | 3.0 | <.10 | 2.0 | <.10 | 4.9 | 4.8 | <.003 | <.0075 | 0.10 |
| PWA-1480 SX | <.006 | 10.0 | Remainder | 5.0 | | 4.0 | 12.0 | | 5.0 | 1.5 | <.0075 | <.0075 | |
| PWA-1483 SX | 0.07 | 12.2 | Remainder | 9.0 | 1.9 | 3.8 | 5.0 | | 3.6 | 4.2 | 0.0001 | 0.002 | |
| Co-based precision casting alloys | | | | | | | | | | | | | |
| FSX 414 | 0.25 | 29.0 | 10 | Remainder | | 7.5 | | | | | 0.010 | | |
| X 45 | 0.25 | 25.0 | 10 | Remainder | | 8.0 | | | | | 0.010 | | |
| ECY 768 | 0.65 | 24.0 | 10 | 51.7 | | 7.5 | 4.0 | | 0.25 | 0.3 | 0.010 | 0.05 | |
| MAR-M-509 | 0.65 | 24.5 | 11 | Remainder | | 7.5 | 4 | | | 0.3 | 0.010 | 0.60 | |
| CM 247 | 0.07 | 8.3 | Remainder | 10.0 | 0.5 | 9.5 | 3.2 | | 5.5 | 0.7 | | | 1.5 |

CERAMIC POWDER, CERAMIC LAYER AND LAYER SYSTEM HAVING GADOLINIUM/MIXED CRYSTAL PYROCHLORE PHASES AND OXIDES

CROSS REFERENCE TO RELATED APPLICATIONS

The present application claims the benefit of the provisional patent application filed on May 07, 2007, and assigned application No. 60/928,085, and the European Patent Office application No. 07009113.7 EP filed May 07, 2007, all of the applications are incorporated by reference herein in their entirety.

FIELD OF INVENTION

The invention relates to a ceramic powder, to a ceramic layer and to a layer system having pyrochlores and oxides.

BACKGROUND OF INVENTION

Such a layer system has a substrate comprising a metal alloy based on nickel or cobalt. Such products are used especially as a component of a gas turbine, in particular as gas turbine blades or heat shields. The components are exposed to a hot gas flow of aggressive combustion gases. They must therefore be able to withstand heavy thermal loads. It is furthermore necessary for these components to be oxidation- and corrosion-resistant. Especially moving components, for example gas turbine blades, but also static components, are furthermore subject to mechanical requirements. The power and efficiency of a gas turbine, in which there are components exposable to hot gas, increase with a rising operating temperature.

In order to achieve a high efficiency and a high power, those gas turbine components which are particularly exposed to high temperatures are coated with a ceramic material. This acts as a thermal insulation layer between the hot gas flow and the metallic substrate.

The metallic base body is protected against the aggressive hot gas flow by coatings. In this context, modern components usually comprise a plurality of coatings which respectively fulfill specific functions. The system is therefore a multilayer system. Since the power and efficiency of gas turbines increase with a rising operating temperature, attempts have continually been made to achieve a higher performance of gas turbines by improving the coating system.

EP 0 944 746 B1 discloses the use of pyrochlores as a thermal insulation layer. The use of a material as a thermal insulation layer, however, requires not only good thermal insulation properties but also good bonding to the substrate.

EP 0 992 603 A1 discloses a thermal insulation layer system of gadolinium oxide and zirconium oxide, which is not intended to have a pyrochlore structure.

SUMMARY OF INVENTION

It is therefore an object of the invention to provide a ceramic powder, a ceramic layer and a layer system having good thermal insulation properties and good bonding to the substrate and therefore a long lifetime.

The object is achieved by a ceramic powder, a ceramic layer and a layer system as claimed in independent claims.

In one aspect the invention is based on the discovery that in order to achieve a long lifetime, the entire system must be considered as a whole and individual layers or some layers together should not be considered and optimized separately from one another.

Further advantageous measures, which may advantageously be combined in any desired way, are mentioned in the dependent claims.

In an embodiment the layer system consists of an outer ceramic layer, which comprises a mixed crystal of gadolinium zirconate and gadolinium hafniate that has particularly good thermal properties (expansion coefficient adapted to the substrate, low thermal conduction coefficient) and harmonizes very well with an interlayer and the substrate of the component.

BRIEF DESCRIPTION OF THE DRAWINGS

Exemplary embodiments of the invention will be explained in more detail below with reference to the drawings, in which:

FIG. 1 shows a layer system according to the invention,
FIG. 2 shows compositions of superalloys,
FIG. 4 shows a turbine blade in perspective.

DETAILED DESCRIPTION OF INVENTION

Figure 3:
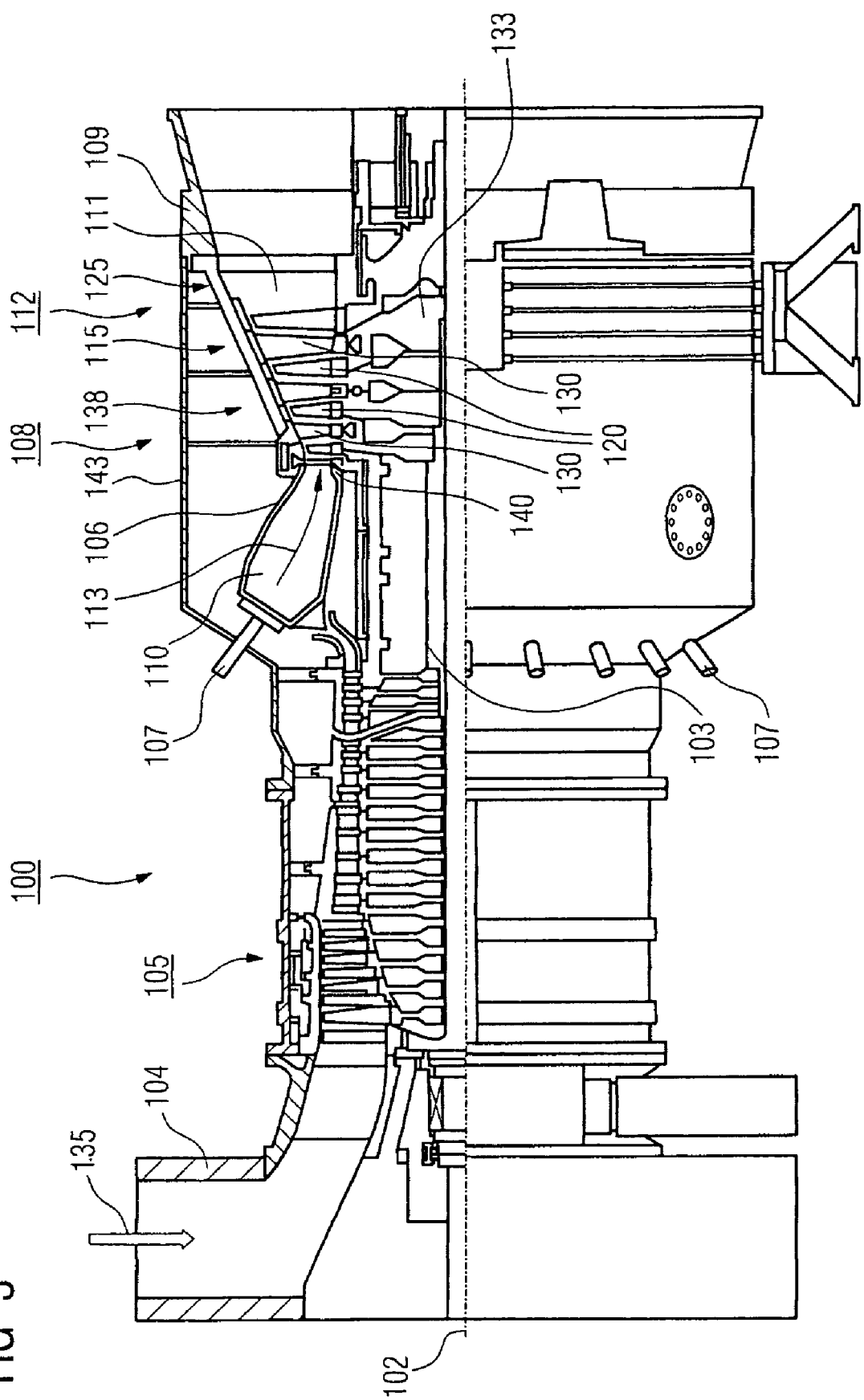
FIG. 3 shows a gas turbine.

The composition of the ceramic powder is also explained with the aid of the composition of the ceramic layer 13 (FIG. 1).

In general, there may always be deviations from the stoichiometry of the pyrochlore structure $A_2B_2O_7$.

A pyrochlore structure has the empirical formula $Gd_v(Zr_x Hf_y) O_z$, where $v \cong 2$, $x+y \cong 2$ and $z \cong 7$. Deviations from this stoichiometric composition for v, x, y and z may arise as a result of defects or minor, deliberate or inadvertent dopings.

The ceramic powder further comprises secondary oxides of zirconium and/or hafnium oxide, in particular with a proportion of from 0.5 wt % to 10 wt %, in particular from 1 wt % to 10 wt %. The secondary oxide is deliberately added to the powder, is therefore well above the measuring detection limit of the secondary oxide, that is to say comprises at least twice the value of the detection limit of the secondary oxide.

The maximum proportion of the secondary oxide or the secondary oxides is preferably 8 wt %,
in particular at most 6 wt % and most particularly between 5 wt % and 7 wt %.

This preferably applies to zirconium oxide.

The maximum proportion of the secondary oxide is similarly preferably 3 wt %, in particular at most 2 wt % and most particularly between 1.5 wt % and 2.5 wt %.

In particular, the proportions apply to hafnium oxide.

In particular, the ceramic powder consists of at least one pyrochlore phase and at least one secondary oxide.

Depending on the application, the secondary oxide may only consist of hafnium oxide, to achieve better thermal insulating properties, or the secondary oxide is only formed by zirconium oxide, to achieve better adaptability of the expansion coefficients to the underlying layers or to the substrate.

A combination of the advantageous properties of hafnium oxide and zirconium oxide can also be achieved by the use of both secondary oxides.

Secondary oxides are preferably present as an oxide.

The ceramic powder can preferably have in each case optionally sintering aids up to 0.05 wt % of silicon oxide, up to 0.1 wt % of calcium oxide, up to 1 wt % of calcium oxide, up to 0.1 wt % of magnesium oxide, up to 0.1 wt % of iron oxide, up to 0.1 wt % of aluminum oxide and up to 0.08 wt % of titanium oxide.

The sintering aids help the layer to hold together after application and/or during use at higher temperatures. The ceramic powder preferably consists of a pyrochlore phase, secondary oxides and optionally the sintering aids.

Preferably, two secondary oxides are present, in particular hafnium oxide and zirconium oxide.

Gadolinium hafnate comprises from 43 wt % to 50 wt %, preferably from 44.7 wt % to 47.7 wt % of gadolinium oxide as powder, the remainder being hafnium oxide and optionally the secondary oxides, preferably zirconium oxide, and the sintering aids. Gadolinium zirconate comprises from 56 wt % to 63 wt %, preferably from 58 wt % to 61 wt % of gadolinium oxide as powder, the remainder being zirconium oxide and optionally the secondary oxides, preferably hafnium oxide, and sintering aids. As the mixed crystal, these proportions are mixed according to the ratio of Hf and Zr.

The outer ceramic layer 13 preferably comprises

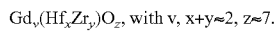
$Gd_v(Hf_xZr_y)O_z$, with v, x+y≈2, z≈7.

The outer ceramic layer 13 preferably also comprises

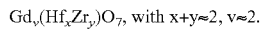
$Gd_v(Hf_xZr_y)O_7$, with x+y≈2, v≈2.

The outer ceramic layer 13 preferably comprises

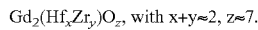
$Gd_2(Hf_xZr_y)O_z$, with x+y≈2, z≈7.

The pyrochlore structure of the ceramic powder preferably consists of $Gd_v(Hf_xZr_y)O_z$, in particular with v≈2, x+y≈2 and z≈7.

Various mixing ratios y:x of zirconium and hafnium may in this case be used.

A larger proportion of zirconium is preferably used. Mixing ratios of 10:90, 20:80, 30:70 or 40:60 are likewise preferably used for hafnium to zirconium. It is furthermore advantageous to use mixing ratios of 50:50, 60:40, 70:30, 80:20 or 90:10 for hafnium to zirconium.

Therefore, the figures given for the ratio of hafnium to zirconium advantageously apply to the ratios of x to y (Hf: Zr=80:20 corresponds to y:x=1.6:0.4).

FIG. 1 shows a layer system according to the invention.

The composition of the ceramic powder is explained by way of example using the ceramic layer 13.

The layer system 1 comprises a metallic substrate 4 which, in particular for components at high temperatures, consists of a nickel- or cobalt-based superalloy (FIG. 2).

There is preferably a metallic bonding layer 7 of MCrAlX type preferably directly on the substrate 4, in particular of the NiCoCrAlX type, which preferably comprises either (11-13) wt % cobalt, (20-22) wt % chromium (10.5-11.5) wt % aluminum, (0.3-0.5) wt % yttrium (=x), (1.5-2.5) wt % rhenium and the remainder nickel, or preferably of (24-26) wt % cobalt, (16-18) wt % chromium (9.5-11) wt % aluminum, (0.3-0.5) wt % yttrium (=x), (1-1.8) wt % rhenium and the remainder nickel.

The NiCoCrAl bonding layer 7 particularly consists of one of these two compositions.

An aluminum oxide layer is preferably already formed on this metallic bonding layer 7 before further ceramic layers are applied, or such an aluminum oxide layer (TGO) is formed during operation.

There is preferably an inner ceramic layer 10, preferably a fully or partially stabilized zirconium oxide layer, on the metallic bonding layer 7 or on the aluminum oxide layer (not shown).

Yttrium-stabilized zirconium oxide, preferably with 6 wt % -8 wt % of yttrium, is preferably used.

Calcium oxide, cerium oxide or hafnium oxide may likewise be used to stabilize zirconium oxide.

The zirconium oxide is preferably applied as a plasma-sprayed layer, it may also preferably be applied as a columnar structure by means of electron beam deposition (EBPVD).

An outer ceramic layer 13 which according to the invention comprises a mixed crystal of gadolinium, hafnium and zirconium with a pyrochlore structure, that is to say is produced from the ceramic powder described above, is applied on the TGO, on the bonding layer 7 or on the inner layer 10. The ceramic layer 13 is preferably produced exclusively from the ceramic powder. The layer 13 is preferably the outermost layer which is exposed to the hot gas.

The secondary oxides are distributed, in particular homogeneously distributed, in the ceramic layer 13.

The layer 13 may have been produced from a powder which provides the proportions of the aforementioned composition. Similarly, the mixed crystals may also be produced during the coating process or by a heat treatment after the coating process.

The layer thickness of the inner layer 10 is preferably between 10% and 50% of the total layer thickness D of the inner layer 10 plus the outer layer 13.

The layer thickness of the inner layer 10 is preferably between 10% and 40% or between 10% and 30% of the total layer thickness.

It is likewise advantageous for the layer thickness of the inner layer 10 to be from 10% to 20% of the total layer thickness.

It is likewise preferable for the layer thickness of the inner layer 10 to be to be between 20% and 50% or between 20% and 40% of the total layer thickness.

Advantageous results are likewise achieved if the contribution of the inner layer 10 to the total layer thickness is between 20% and 30%.

The layer thickness of the inner layer 10 is preferably from 30% to 50% of the total layer thickness.

It is likewise advantageous for the layer thickness of the inner layer 10 to comprise from 30% to 40% of the total layer thickness.

It is likewise preferable for the layer thickness of the inner layer 10 to be between 40% and 50% of the total layer thickness.

Although the pyrochlore phase has better heat insulating properties than the $ZrO_2$ layer, the $ZrO_2$ layer may be made the same thickness as the pyrochlore phase.

For short-term use with high temperatures of the layer system, the outer layer 13 may be configured to be thinner than the inner layer 10, i.e. the layer thickness of the outer layer 13 is between 10% and 40% of the total layer thickness of the inner layer 10 plus the outer layer 13.

The inner ceramic layer 10 preferably has a thickness of from 100 μm to 200 μm, in particular 150 μm±10%.

The total layer thickness D of the inner layer 10 plus the outer layer 13 is preferably 300 μm of preferably 450 μm. The maximum total layer thickness is advantageously 800 μm or advantageously at most 600 μm.

FIG. 3 shows a gas turbine 100 by way of example in a partial longitudinal section.

The gas turbine 100 internally comprises a rotor 103 mounted so as to rotate about a rotation axis 102 and having a shaft 101, which will also be referred to as the turbine rotor.

Successively along the rotor 103, there are an intake manifold 104, a compressor 105, an e.g. toroidal combustion chamber 110, in particular a ring combustion chamber, having a plurality of burners 107 arranged coaxially, a turbine 108 and the exhaust manifold 109.

The ring combustion chamber 110 communicates with an e.g. annular hot gas channel 111. There, for example, four successively connected turbine stages 112 form the turbine 108.

Each turbine stage 112 is formed for example by two blade rings. As seen in the flow direction of a working medium 113, a guide vane row 115 is followed in the hot gas channel 111 by a row 125 formed by rotor blades 120.

The guide vanes 130 are fastened on an inner housing 138 of a stator 143 while the rotor blades 120 of a row 125 are fastened on the rotor 103, for example by means of a turbine disk 133. Coupled to the rotor 103, there is a generator or a work engine (not shown).

During operation of the gas turbine 100, air 135 is taken in by the compressor 105 through the intake manifold 104 and compressed. The compressed air provided at the turbine-side end of the compressor 105 is delivered to the burners 107 and mixed there with a fuel. The mixture is then burnt to form the working medium 113 in the combustion chamber 110. From there, the working medium 113 flows along the hot gas channel 111 past the guide vanes 130 and the rotor blades 120. At the rotor blades 120, the working medium 113 expands by imparting momentum, so that the rotor blades 120 drive the rotor 103 and the work engine coupled to it.

During operation of the gas turbine 100, the components exposed to the hot working medium 113 experience thermal loads. Apart from the heat shield elements lining the ring combustion chamber 110, the guide vanes 130 and rotor blades 120 of the first turbine stage 112, as seen in the flow direction of the working medium 113, are heated the most.

In order to withstand the temperatures prevailing there, they may be cooled by means of a coolant.

Substrates of the components may likewise comprise a directional structure, i.e. they are monocrystalline (SX structure) or comprise only longitudinally directed grains (DS structure).

Iron-, nickel- or cobalt-based superalloys are for example used as material for the components, in particular for the turbine blades 120, 130 and components of the combustion chamber 110.

Such superalloys are known for example from EP 1 204 776 B1, EP 1 306 454, EP 1 319 729 A1, WO 99/67435 or WO 00/44949; these documents form part of the disclosure with respect to the chemical composition of the alloys.

The guide vanes 130 comprise a guide vane root (not shown here) facing the inner housing 138 of the turbine 108, and a guide vane head lying opposite the guide vane root. The guide vane head faces the rotor 103 and is fixed to a fastening ring 140 of the stator 143.

FIG. 4 shows a perspective view of a rotor blade 120 or guide vane 130 of a turbomachine, which extends along the longitudinal axis 121.

The turbomachine may be a gas turbine of an aircraft or of a power plant for electricity generation, a steam turbine or a compressor.

The blade 120, 130 comprises, successively along the longitudinal axis 121, a fastening zone 400, a blade platform 403 adjacent thereto as well as a blade surface 406 and a blade tip 415.

As a guide vane 130, the vane 130 may have a further platform (not shown) at its vane tip 415.

A blade root 183 which is used to fasten the rotor blades 120, 130 on a shaft or a disk (not shown) is formed in the fastening region 400.

The blade root 183 is configured, for example, as a hammerhead. Other configurations as a firtree or dovetail root are possible.

The blade 120, 130 comprises a leading edge 409 and a trailing edge 412 for a medium which flows past the blade surface 406.

In conventional blades 120, 130, for example, solid metallic materials are used in all regions 400, 403, 406 of the blade 120, 130.

Such superalloys are known for example from EP 1 204 776 B1, EP 1 306 454, EP 1 319 729 A1, WO 99/67435 or WO 00/44949; these documents form part of the disclosure with respect to the chemical composition of the alloy.

The blades 120, 130 may in this case be manufactured by a casting method, also by means of directional solidification, by a forging method, by a machining method or combinations thereof.

Workpieces with a monocrystalline structure or structures are used as components for machines which are exposed to heavy mechanical, thermal and/or chemical loads during operation.

Such monocrystalline workpieces are manufactured, for example, by directional solidification from the melts. These are casting methods in which the liquid metal alloy is solidified to form a monocrystalline structure, i.e. to form the monocrystalline workpieces, or is directionally solidified.

Dendritic crystals are in this case aligned along the heat flux and form either a rod crystalline grain structure (columnar, i.e. grains which extend over the entire length of the workpiece and in this case, according to general terminology usage, are referred to as directionally solidified) or a monocrystalline structure, i.e. the entire workpiece consists of a single crystal. It is necessary to avoid the transition to globulitic (monocrystalline) solidification in this method, since nondirectional growth will necessarily form transverse and longitudinal grain boundaries which negate the beneficial properties of the directionally solidified or monocrystalline component.

When directionally solidified structures are referred to in general, this is intended to mean both single crystals which have no grain boundaries or at most small-angle grain boundaries, and also rod crystal structures which, although they do have grain boundaries extending in the longitudinal direction, do not have any transverse grain boundaries. These latter crystalline structures are also referred to as directionally solidified structures.

Such methods are known from U.S. Pat. No. 6,024,792 and EP 0 892 090 A1; these documents form part of the disclosure with respect to the solidifying process.

The blades 120, 130 may likewise represent coatings against corrosion or oxidation, for example (MCrAlX; M is at least one element from the group ion (Fe), cobalt (Co), nickel (Ni), X is an active element and stands for yttrium (Y) and/or silicon and/or at least one rare earth element, or hafnium (Hf)). Such alloys are known from EP 0 486 489 B1, EP 0 786 017 B1, EP 0 412 397 B1 or EP 1 306 454 A1 which are intended to form part of this disclosure with respect to the chemical composition of the alloy.

The density is preferably 95% of the theoretical density.

A protective aluminum oxide layer (TGO=thermally grown oxide layer) is formed on the MCrAlX layer (as an interlayer or as the outermost layer).

On the MCrAlX layer, there may be furthermore a thermal insulation layer which is preferably the outermost layer and consists of the layer system 1 according to the invention.

The thermal insulation layer covers the entire MCrAlX layer.

Rod-shaped grains are produced in the thermal insulation layer by suitable coating methods, for example electron beam deposition (EBPVD).

Other coating methods may also be envisaged, for example atmospheric plasma spraying (APS), LPPS, VPS or CVD. The thermal insulation layer may have porous, micro-cracked or macro-cracked grains for better thermal shock resistance. The thermal insulation layer is thus preferably more porous than the MCrAlX layer.

The blade 120, 130 may be designed to be a hollow or solid. If the blade 120, 130 is intended to be cooled, it will be hollow and optionally also comprise film cooling holes 418 (indicated by dashes).

Figure 5:
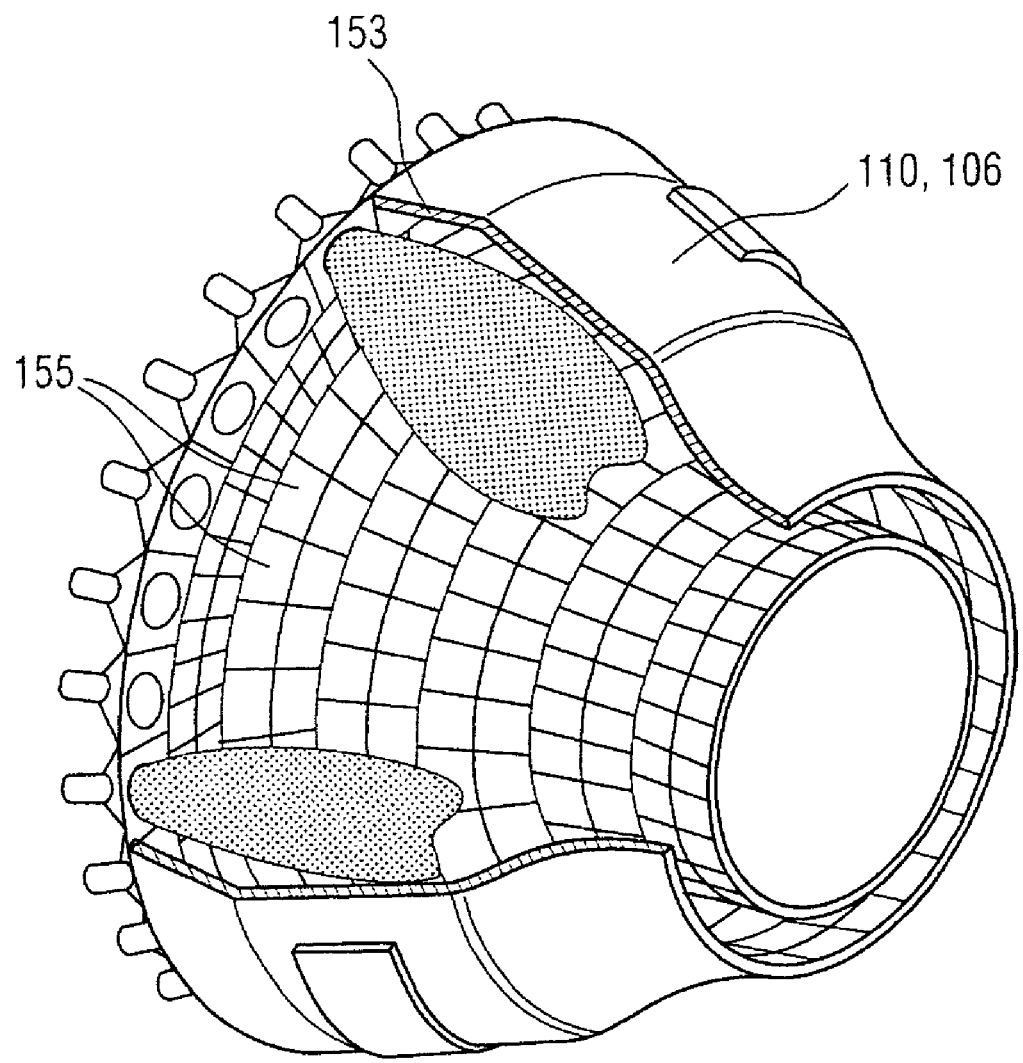
FIG. 5 shows a combustion chamber in perspective.

FIG. 5 shows a combustion chamber 110 of the gas turbine 100. The combustion chamber 110 is designed for example as a so-called ring combustion chamber in which a multiplicity of burners 107, which produce flames 156 and are arranged in the circumferential direction around a rotation axis 102, open into a common combustion chamber space 154. To this end, the combustion chamber 110 as a whole is designed as an annular structure which is positioned around the rotation axis 102.

In order to achieve a comparatively high efficiency, the combustion chamber 110 is designed for a relatively high temperature of the working medium M, i.e. about 1000° C. to 1600° C. In order to permit a comparatively long operating time even under these operating parameters which are unfavorable for the materials, the combustion chamber wall 153 is provided with an inner lining formed by heat shield elements 155 on its side facing the working medium M.

Owing to the high temperature inside the combustion chamber 110, a cooling system may also be provided for the heat shield elements 155 or for their retaining elements. The heat shield elements 155 are then hollow, for example, and optionally also have cooling holes (not shown) opening into the combustion chamber space 154.

Each heat shield element 155 is equipped with a particularly heat-resistant protective layer (MCrAlX layer and/or ceramic coating) on the working medium side or is made of refractory material (solid ceramic blocks).

These protective layers may be similar to the turbine blades, i.e. for example MCrAlX means: M is at least one element from the group ion (Fe), cobalt (Co), nickel (Ni), X is an active element and stands for yttrium (Y) and/or silicon and/or at least one rare earth element, or hafnium (Hf). Such alloys are known from EP 0 486 489 B1, EP 0 786 017 B1, EP 0 412 397 B1 or EP 1 306 454 A1 which are intended to form part of this disclosure with respect to the chemical composition of the alloy.

On the MCrAlX layer, there may furthermore be a ceramic thermal insulation layer and consists of the layer system 1 according to the invention.

Rod-shaped grains are produced in the thermal insulation layer by suitable coating methods, for example electron beam deposition (EBPVD).

Other coating methods may also be envisaged, for example atmospheric plasma spraying (APS), LPPS, VPS or CVD. The thermal insulation layer may have porous, micro-cracked or macro-cracked grains for better thermal shock resistance.

Refurbishment means that turbine blades 120, 130, heat shield elements 155 may need to have protective layers taken off (for example by sandblasting) after their use. Corrosion and/or oxidation layers or products are then removed. Optionally, cracks in the turbine blade 120, 130 or the heat shield element 155 are also repaired. The turbine blade 120, 130, heat shield element 155 is then recoated and the turbine blade 120, 130, heat shield element 155 is used again.

The invention claimed is:

1. A ceramic powder, consisting of:
   a pyrochlore structure $Gd_v(Zr_xHf_y)O_z$ wherein $v\approx2$, $x+y\approx2$ and $z\approx7$; and
   secondary oxides wherein the secondary oxides are selected from the group consisting of zirconium oxide, hafnium oxide, and a combination thereof, wherein the secondary oxides have a proportion of from 0.5 wt % to 10 wt %; and
   a sintering aid, wherein the sintering aid is selected from the group consisting of
   up to 0.05 wt % silicon oxide,
   up to 0.1 wt % calcium oxide,
   up to 0.1 wt % magnesium oxide,
   up to 0.1 wt % iron oxide,
   up to 0.1 wt % aluminum oxide,
   up to 0.8 wt % titanium oxide, and
   a combination thereof.

2. A ceramic powder, comprising:
   a pyrochlore structure $Gd_v(Zr_xHf_y)O_z$ wherein $v\approx2$, $x+y\approx2$ and $z\approx7$; and
   a secondary oxide wherein the secondary oxide is selected from the group consisting of hafnium oxide, zirconium oxide and a combination thereof.

3. The ceramic powder as claimed in claim 2, wherein the secondary oxide is based upon zirconium.

4. The ceramic powder as claimed in claim 2, wherein the secondary oxide is based upon hafnium.

5. The ceramic powder as claimed in claim 3, wherein the ceramic powder further comprises another secondary oxide that is based upon hafnium.

6. The ceramic powder as claimed in claim 2, wherein the secondary oxides have a proportion of from 0.5 wt % to 10 wt %.

7. The ceramic powder as claimed in claim 2, further comprising sintering aids, wherein at least one sintering aid is selected from the group consisting of
   up to 0.05 wt % silicon oxide,
   up to 0.1 wt % calcium oxide,
   up to 0.1 wt % magnesium oxide,
   up to 0.1 wt % iron oxide,
   up to 0.1 wt % aluminum oxide,
   up to 0.8 wt % titanium oxide, and
   a combination thereof.

8. The ceramic powder as claimed in claim 2, wherein the secondary oxide is hafnium oxide of 1.5 wt % to 2.5 wt %.

9. The ceramic powder as claimed in claim 2, wherein the secondary oxide is zirconium oxide of 5 wt % to 7 wt %.

10. The ceramic powder as claimed in claim 5, wherein the mixing ratio of hafnium and zirconium in the pyrochlore phase is between 30:70 and 40:60 molar content.

11. The ceramic powder as clainied in claim 5, wherein the mixing ratio of hafnium and zirconium in the pyrochlore phase is 50:50 molar content.

12. The ceramic powder as claimed in claim 5, wherein the mixing ratio of hafnium and zirconium is between 60:40 and 70:30 molar content.

13. The ceramic powder as claimed in claim 5, wherein the mixing ratio of hafnium and zirconium is between 10:90 and 20:80 molar content.

14. The ceramic powder as claimed in claim 5, wherein the mixing ratio of hafnium and zirconium in the pyrochlore phase is between 80:20 and 90:10 molar content.

15. The ceramic powder as claimed in claim 2, wherein y is >x.

16. The ceramic powder as claimed in claim 2, wherein y is <x.

17. A ceramic layer, comprising:
    a pyrochlore structure $Gd_v(Zr_xHf_y)O_z$ wherein $v\approx2$, $x+y\approx2$ and $z\approx7$; and
    a secondary oxide wherein the secondary oxide is selected from the group consisting of hafnium oxide, zirconium oxide and a combination thereof.

* * * * *